US012202629B2

(12) United States Patent
Rey et al.

(10) Patent No.: US 12,202,629 B2
(45) Date of Patent: Jan. 21, 2025

(54) APPARATUS AND METHODS FOR SPACECRAFT ATTITUDE CONTROL USING A SOLAR SAIL

(71) Applicant: CANADIAN SPACE AGENCY, Saint-Hubert (CA)

(72) Inventors: Daniel Rey, St-Bruno (CA); Farhad Aghili, Brossard (CA); Franco Moroso, St-Bruno-de-Montarville (CA)

(73) Assignee: CANADIAN SPACE AGENCY, Saint-Hubert (CA)

(*) Notice: Subject to any disclaimer, the term of this patent is extended or adjusted under 35 U.S.C. 154(b) by 50 days.

(21) Appl. No.: 18/208,641

(22) Filed: Jun. 12, 2023

(65) Prior Publication Data

US 2023/0322417 A1 Oct. 12, 2023

Related U.S. Application Data

(63) Continuation of application No. 16/993,994, filed on Aug. 14, 2020, now abandoned.

(51) Int. Cl.
*B64G 1/40* (2006.01)
*B64G 1/28* (2006.01)

(52) U.S. Cl.
CPC ............. *B64G 1/407* (2013.01); *B64G 1/283* (2013.01)

(58) Field of Classification Search
CPC ...... B64G 1/407; B64G 1/283; B64G 1/1064; B64G 1/244; B64G 1/12; B64G 1/2224; B64G 1/2225; B64G 2004/005; B64G 4/00
See application file for complete search history.

(56) References Cited

U.S. PATENT DOCUMENTS 4,262,867 A * 4/1981 Piening .................... B64G 1/44 244/172.7
9,150,312 B2 * 10/2015 Ellinghaus ........... B64G 1/6462
2019/0144141 A1 * 5/2019 Barnes ...................... B64G 1/50 244/171.5

* cited by examiner

*Primary Examiner* — Medhat Badawi
*Assistant Examiner* — Vicente Rodriguez
(74) *Attorney, Agent, or Firm* — Nolte Lackenbach Siegel

(57) ABSTRACT

An attitude control module is described for providing propellant-free attitude control and momentum desaturation to a spacecraft. The attitude control module includes at least one solar sail comprising a reflective surface for reflecting solar photons; and at least one robotic arm coupled to the at least one solar sail, said at least one robotic arm comprising at least 4 degrees of freedom for positioning and orienting the at least one solar sail relative to the spacecraft. A corresponding method for operating the attitude control module to unload excess momentum from a spacecraft is also described.

23 Claims, 8 Drawing Sheets

APPARATUS AND METHODS FOR SPACECRAFT ATTITUDE CONTROL USING A SOLAR SAIL

CROSS REFERENCE TO RELATED APPLICATIONS

The application is a continuation of co-pending U.S. patent application Ser. No. 16/993,994 filed on Aug. 14, 2020. The entire content of the application is hereby incorporated by reference as through fully set forth herein.

TECHNICAL FIELD

The technical field generally relates to spacecraft, and more specifically to systems and methods for spacecraft attitude control without the use of propellant.

BACKGROUND

Spacecraft are often provided with reaction wheels which allow for momentum to be transferred between the wheels and the spacecraft body. Transferring momentum in this fashion can allow for precise control of the spacecraft's attitude. However, excess momentum can build up in the reaction wheels over time as they counter disturbance torques imparted on the spacecraft. It is therefore necessary to regularly unload excess momentum building up in the reaction wheels to avoid saturation and maintain attitude control.

There are different existing methods for unloading momentum of a spacecraft. Such methods involve using some form of actuator to generate a torque which can be used to counter the excess momentum. For spacecraft in proximity to an ambient magnetic field, a common method for unloading momentum involves the use of magnetorquers to interact with the ambient magnetic field to generate a desired torque. However, such a technique is not suitable when a strong ambient magnetic field is not available, for example if the spacecraft is in lunar orbit. Another method is to utilize thrusters to generate a torque which counters the excess momentum. However, this technique requires consuming propellant which is limited in supply. Moreover, significant costs can be incurred over the lifetime of the spacecraft to transport the required propellant.

SUMMARY

According to an aspect, an attitude control module for providing propellant-free attitude control and momentum desaturation to a spacecraft is provided. The attitude control module includes: at least one solar sail comprising a reflective surface for reflecting solar photons; and at least one robotic arm coupled to the at least one solar sail, said at least one robotic arm comprising at least 4 degrees of freedom for positioning and orienting the at least one solar sail relative to the spacecraft.

According to an aspect, a method for desaturating reaction wheels of a spacecraft is provided. The method includes: determining a momentum vector corresponding to excess momentum stored in the reaction wheels; operating at least one robotic arm along at least 4 degrees of freedom to position and orient at least one solar sail coupled to the at least one robotic arm into an active mode in which the at least one solar sail is exposed to solar radiation and generates a torque opposing the momentum vector; and desaturating the reaction wheels using the torque generated by the at least one solar sail. In embodiments, the method can be carried out by an attitude control system comprising one or more controllers. A non-transitory computer readable medium can also be provided with instructions stored thereon to cause a processor to carry out the steps of the method.

DETAILED DESCRIPTION

Figure 1:
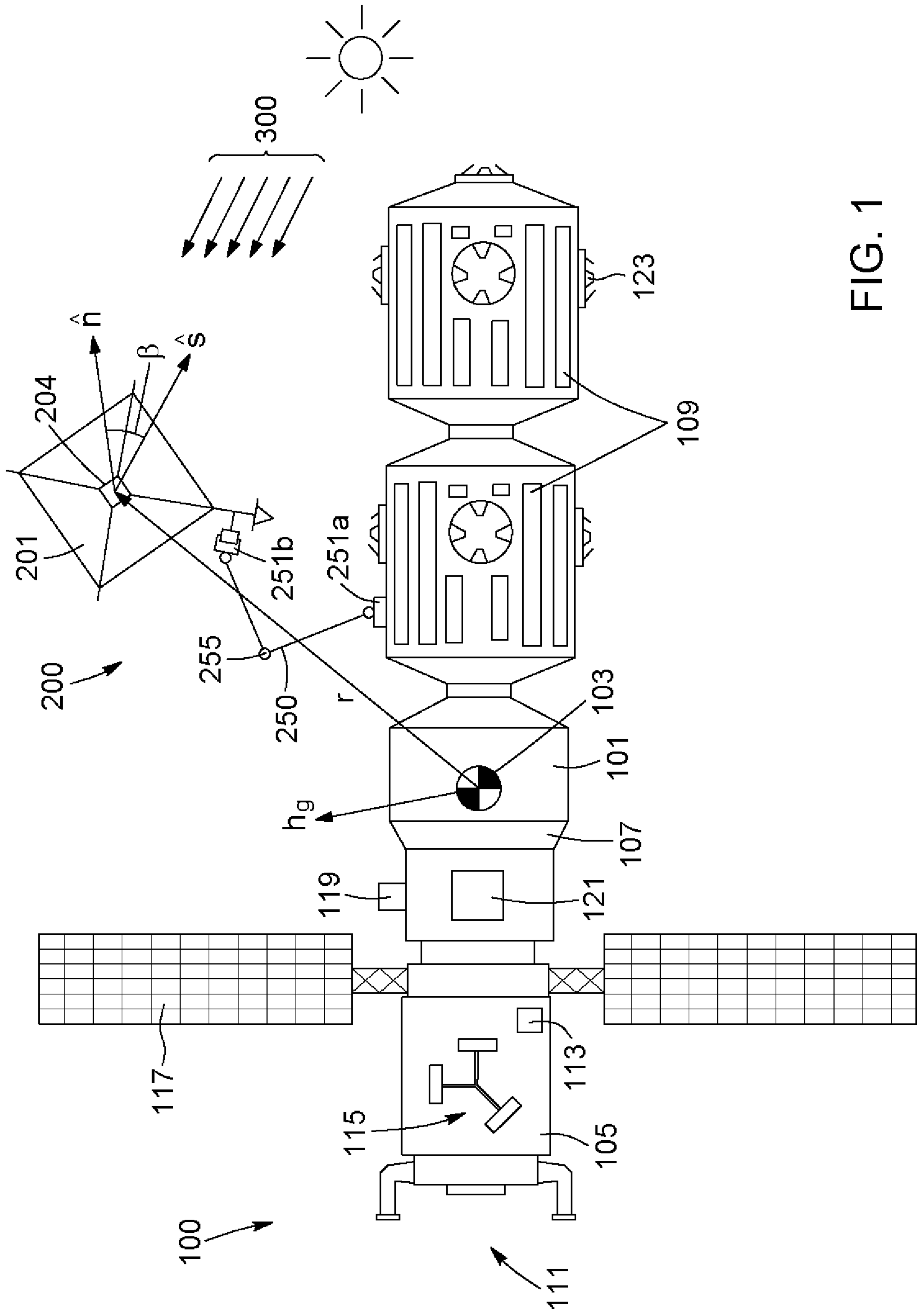
FIG. 1 is a diagrammatic view of a spacecraft comprising a solar sail attitude control module, according to an embodiment.

Various embodiments are described hereinafter with reference to the figures. It should be noted that, for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements. In addition, numerous specific details are set forth in order to provide a thorough understanding of the exemplary embodiments described herein. However, it will be understood by those of ordinary skill in the art that the embodiments described herein may be practiced without these specific details. In other instances, well-known methods, procedures and components have not been described in detail so as not to obscure the embodiments described herein. Furthermore, the description and figures are not to be considered as limiting the scope of the invention in any way, but rather as merely describing the implementation of the various exemplary embodiments.

With reference to FIG. 1, an exemplary spacecraft 100 is shown according to an embodiment. In the present embodiment, the spacecraft 100 is a space station designed to operate in lunar orbit. It is appreciated, however, that other types of spacecraft are possible. For example, in alternate embodiments, the spacecraft can be any type of vehicle, station, probe, artificial satellite, etc. designed to operate in space.

The spacecraft 100 comprises a body 101 having a center of mass (CoM) 103. In the illustrated embodiment, the spacecraft comprises a plurality of interconnected modules defining the body 101. In particular, the spacecraft 100 comprises a power and propulsion module 105, a logistics and habitat module 107, and additional habitation modules 109. It is appreciated that a different combination of modules is possible in different embodiments. Moreover, it is appreciated that other embodiments of spacecraft need not have a modular design.

As can be appreciated, the spacecraft 100 can comprise a plurality of subsystems for carrying out various functions for spacecraft operation. Components of such subsystems can be provided by one or more modules. As an example, in the present embodiment, the spacecraft 100 comprises: a propulsion subsystem, for example comprising ion thrusters 111; an attitude determination and control subsystem, for example comprising attitude sensors 113 (such as a sun sensor, star tracker, etc.), reaction wheels 115, control moment gyroscopes (CMGs) 116, and torque rods 118; a power subsystem, for example comprising a solar array 117; a communications subsystem, for example comprising RF antennas 119; and a spacecraft control subsystem, for example comprising onboard computer 121. It is appreciated that different subsystems can be provided in other embodiments.

Figure 2:
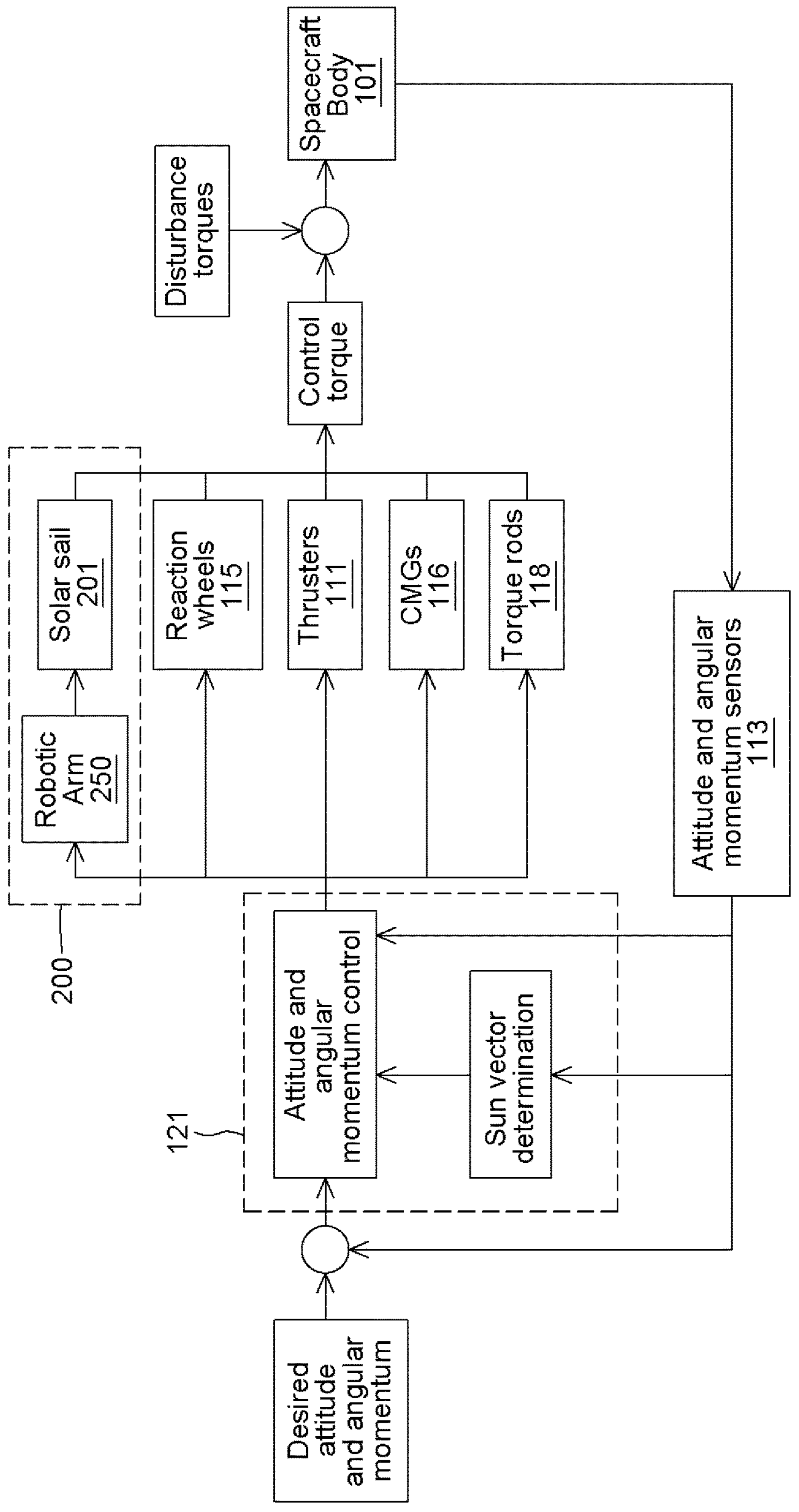
FIG. 2 is a control diagram illustrating a spacecraft attitude determination and control subsystem comprising the solar sail attitude control module of FIG. 1, according to an embodiment.

In the present embodiment, the spacecraft 100 further comprises a solar sail attitude control module 200 for generating torque using solar radiation 300. The attitude control module 200 comprises a solar sail 201 and a robotic arm 250 operable to control a position and orientation of the solar sail 201 relative to spacecraft body 101 and/or relative to the solar radiation 300. As can be appreciated, controlling the position and orientation of the solar sail 201 in this fashion can allow precisely controlling the torque applied to spacecraft body 101 via the solar sail 201. This torque can be used to assist in spacecraft attitude control, for example by maintaining a pointing direction of the spacecraft and/or allowing for excess momentum to be unloaded. In the present embodiment, attitude control module 200 is illustrated as an integrated part of spacecraft 100. It is appreciated, however, that other configurations are possible. For example, in some embodiments attitude control module 200 can be provided as part of a separate servicing module which can be operatively coupled to spacecraft 100 when required. It should further be appreciated that the solar sail attitude control module 200 can generally be integrated as a part of the spacecraft's attitude determination and control subsystem. As illustrated in FIG. 2, the solar sail attitude control module 200 can cooperate with various other spacecraft components to provide the required control torque to attain desired attitude and angular momentum of the spacecraft.

Figure 3:
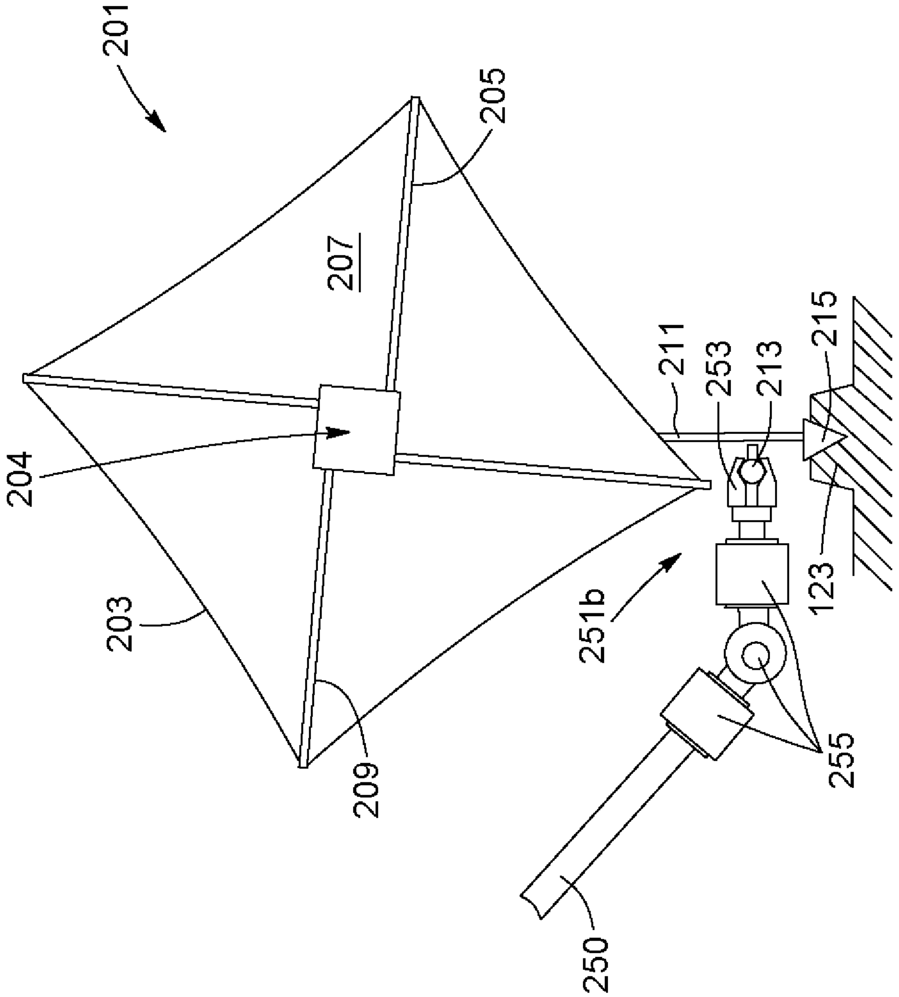
FIG. 3 is a detail view of the solar sail attitude control module of FIG. 1, with the solar sail stowed at a stowage interface on the spacecraft.

With reference now to FIG. 3, the solar sail 201 is shown in more detail. Broadly described, the solar sail 201 comprises a sail film 203 and a support structure 205. The sail film 203 is preferably a thin, lightweight film, providing the solar sail 201 with a large reflective surface 207. This reflective surface 207 serves to reflect solar photons and thereby transform the momentum of the solar photons into a propulsive force. When the sail 201 is exposed to solar radiation, a propulsive force acts through the sail 201 at an optical pressure center (OPC) 204, corresponding to a point where the total sum of the solar radiation pressure field acts on the sail 201. As can be appreciated, the sail film 203 can be made from any suitable material, such as aluminum-coated plastic film.

The support structure 205 can serve to support the film 203 and comprise mechanisms to store, deploy, tension and/or retract the film 203. As can be appreciated, the support structure can vary depending on the type of sail being used. In the present embodiment, the solar sail 201 is a square solar sail which is commonly used in deep space missions. Accordingly, the support structure 205 includes a plurality of support booms 209 for spreading the corners of the sail and tensioning the film 203. The support structure 205 further includes fixtures for manipulating and parking the sail 201. More specifically, a grasping fixture 213 is provided for facilitating grasping of the structure 205 by robotic arm 250. A stowage fixture 215 is also provided for engaging with a corresponding stowage interface 123 on spacecraft body 100, for example to allow storing the sail 201 when not in use at one or more fixed positions on spacecraft body 101. The grasping fixture 213 and stowing fixture 215 are spaced apart from the sail film 203 via a standoff boom 211.

As can be appreciated, a common performance index of a solar sail is defined by areal density a which is the mass of the sail assembly (i.e. the sail film 203 and support structure 205) per unit area of the reflective surface 207. Accordingly, to reduce the areal density a it is preferred to have a support structure 205 that is as lightweight as possible. Moreover, since the solar radiation pressure force is proportional to the reflective area 207 of the sail, it is also preferred to have a sail with a large reflective area 207, for example 30 $m^2$ or more.

Figure 4C:
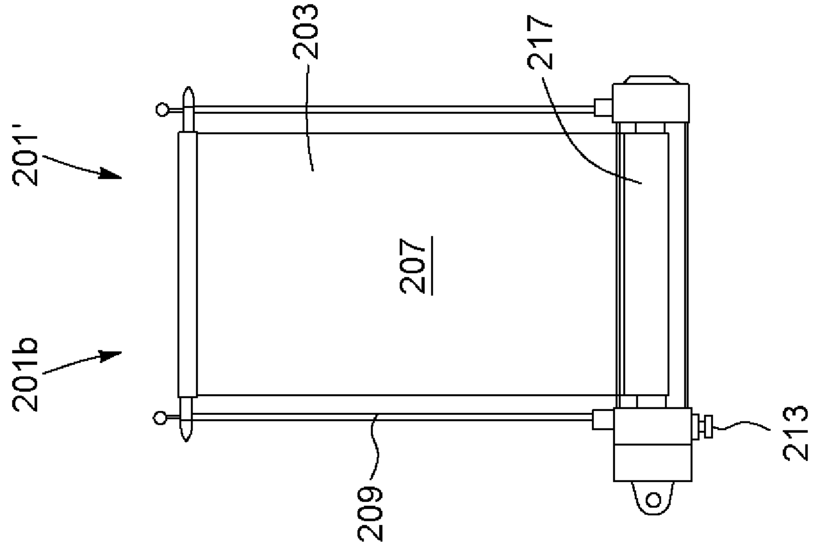
FIGS. 4A, 4B and 4C are diagrammatic views of a solar sail respectively in a retracted, a partially deployed, and a fully deployed configuration, according to an embodiment comprising a spool-type deployment mechanism.
Figure 4B:
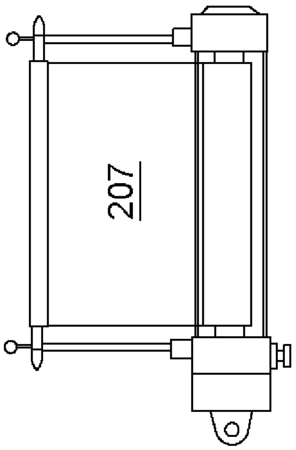
Figure 4A:
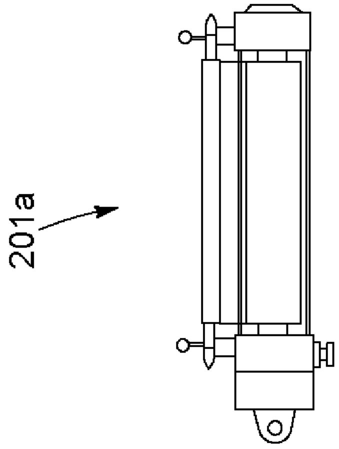

Although a square solar sail 201 has been described above, it is appreciated that other solar sail shapes and deployment mechanisms are possible. For example, with reference to FIGS. 4A, 4B and 4C, an alternate embodiment of a solar sail 201' is shown, comprising a spool-based deployment mechanism. In this embodiment, the sail film 203 is wrapped around a spool in a stowage drum 217. The sail 201' can be operated between a stowed configuration 201*a* and a deployed configuration 201*b* by extending or retracting support booms 209, In the stowed configuration 201*a*, the sail film 203 is retracted and sheltered from solar radiation within drum 217. In the deployed configuration 201*b*, the sail film 203 extends outside drum 217 and is tensioned in a rectangular shape to expose a planar reflective surface 207.

Figure 5C:
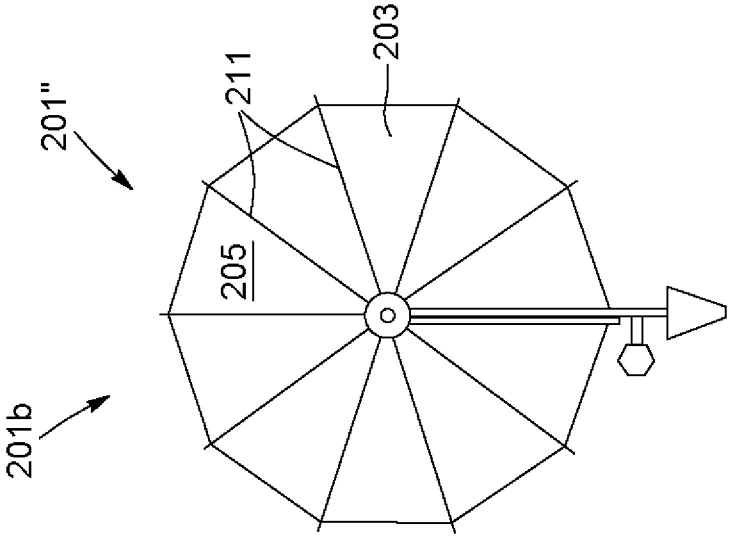
FIGS. 5A, 5B and 5C are diagrammatic views of a solar sail respectively in a retracted, a partially deployed, and a fully deployed configuration, according to an embodiment comprising a swing-type deployment mechanism.
Figure 5B:
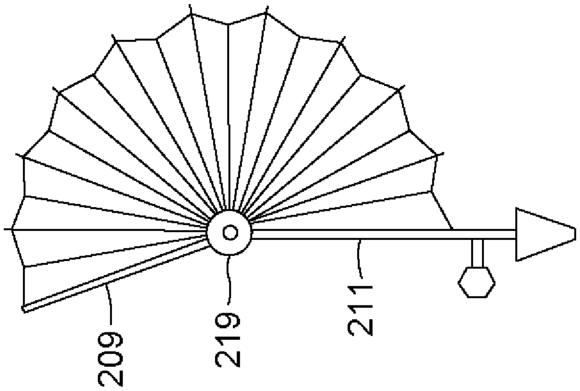
Figure 5A:
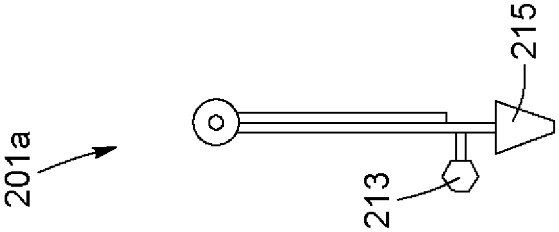

As another example, and with reference to FIGS. 5A, 5B and 5C, an alternate embodiment of a solar sail 201" is shown, comprising a swing-based deployment mechanism. In this embodiment, the sail film 203 extends about a central hub 219 and is secured at one end to a support boom 209, and at another end to standoff boom 211. The sail 201" can be operated between a stowed configuration 201*a* and a deployed configuration 201*b* by pivoting support boom 209 about the central hub 219 to unfold the sail film 203. In the stowed configuration 201*a*, the sail film is folded and sheltered from solar radiation. In the deployed configuration 201*b*, the sail film 203 extends about hub 205 and is tensioned by a plurality of spars 221 in a substantially circular shape to expose a planar reflective surface 207.

In the above-described examples, the solar sail 201 provides a unitary and substantially planar reflective surface 207. In this fashion, the solar sail 201 can allow generating a propulsive force perpendicular to the surface 207. It is appreciated, however, that other solar sail configurations are possible. For example, in some embodiments, the solar sail 201 can be provided with a plurality of differently oriented reflective surfaces, for example such that the sail 201 is configured with windmill-like opposing tilting features. In such configurations, the sail 201 can provide a roll torque while in a sun pointing mode.

With reference now to FIGS. 1 and 3, robotic arm 250 couples solar sail 201 to spacecraft body 101 and further allows positioning and orienting solar sail 201 relative to spacecraft body 101 to generate a desired torque. More specifically, the robotic arm 250 comprises a first extremity 251*a* coupled to the spacecraft body 101 and a second extremity 251*b* coupled to the solar sail 201. As can be appreciated, the robotic arm 250 can be removably coupled to solar sail 201 and/or spacecraft body 101. For example, in the present embodiment, the robotic arm 250 comprises a grasping mechanism 253 at second extremity 251*b* for interfacing with grasping fixture 215, although it is appreciated that other coupling mechanisms are possible. In this configuration, the robotic arm 250 can grasp the sail 201 to manipulate it when desired, and release the sail 201 (for example when the sail 201 is stowed on the spacecraft body 101 via stowage fixture 215) to free up the robotic arm 250 to perform other tasks. In some embodiments, the robotic arm 250 can be removably coupled to spacecraft body 101. For example, a coupling mechanism, such as a grasping mechanism, can be provided at first extremity 251*a* for coupling with a plurality of corresponding grasping fixtures (or other coupling fixtures) on spacecraft body 101. In this configuration, the robotic arm 201 can be repositioned at a plurality of different locations on the spacecraft body 101, thus providing more options for solar sail 201 positioning relative to the spacecraft body 101. Although in the described examples the robotic arm 250 is removably coupled to spacecraft body 101 and solar sail 201, it is appreciated that in other embodiments, the robotic arm 250 can be permanently coupled to spacecraft body 101 and/or solar sail 201. For example, in some embodiments, the solar sail 201 can be integrated in robotic arm 250.

The robotic arm 250 can be configured with a plurality of joints or articulations 225, allowing the arm 250 to operate through a plurality of degrees of freedom. Preferably, the arm 250 is configured with at least four degrees of freedom, to provide the arm 250 with the capability of manipulating sail 201 to provide a control torque about any axis perpendicular to the sun vector, such as the pitch and yaw axes where the spacecraft 100 sunpointing axis is considered the roll axis. For example, the arm 250 can be configured to adjust an orientation of the solar sail reflective surface 207 along two degrees of freedom (such as azimuth and elevation angles) and to adjust a position of the solar sail's OPC 204 relative to the spacecraft's CoM 103 along two degrees of freedom. The position of the OPC 204 can be defined by a vector connecting the OPC 204 and the CoM 103 whose orientation is defined by azimuth and elevation angles.

As can be appreciated, sufficient reach of the robotic arm 250 and at least two of the at least four degrees of freedom can be required to place the solar sail OPC 204 in any of the four quadrants of the pitch-yaw plane, i.e. any of the up-down and starboard-port quadrants of the pitch-yaw plane. The other two degrees of freedom can be required, with sufficient range of motion, to align the solar sail normal vector with the sun pointing vector for maximum effect when desired, i.e. matching azimuth and elevation angles, and/or to position the solar sail normal vector perpendicular to the sun pointing vector for minimum effect when desired, i.e. to switch the solar sail into a passive state.

Providing at least four degrees of freedom can enable positioning and orienting the solar sail 201 without constraints, and can further allow easily switching the sail between different modes of operation (such as active and passive modes, as will be described in more detail hereinafter). In the present embodiment, seven articulations 255 are provided in the arm 250, providing seven degrees of freedom and a similar range of motion as a human arm. More specifically, the arm 250 comprises three articulations at the first extremity 251*a* (i.e. the "shoulder"), three articulations at the second extremity 251*b* (i.e. the "wrist"), and one articulation between the first 251*a* and second 251*b* extremities (i.e. the "elbow"). It is appreciated, however, that other configurations are possible. For example, the arm 250 can be provided with more degrees of freedom or fewer degrees of freedom. In some embodiments, if the angular momentum or attitude perturbation only occurs in a particular repeating direction for a given spacecraft configuration and orbit, it is possible to reduce the number of degrees of freedom from four to three or two.

As can be appreciated, depending on the number and configuration of articulations and degrees of freedom, the robotic arm 250 can take on different shapes and forms. Accordingly, the term "robotic arm" as used herein refers to any robotic assembly that can be used to manipulate a position and/or orientation of solar sail 201 and need not necessarily resemble an anatomical arm.

Using the robotic arm 250, the solar sail 201 can be operated in an active mode in which it is positioned and oriented to generate a torque in a desired direction, for example to unload excess momentum from spacecraft 100 or to maintain a pointing direction of spacecraft 100. More specifically, the robotic arm 250 can be operated to orient the solar sail 201 towards solar radiation 300 so as to generate force from solar radiation pressure (SRP), and further to offset the sail's OPC 204 from the spacecraft's CoM 103 to produce a torque. In the illustrated example, assuming sail 201 is an ideal flat sail with an area A, the solar radiation force acting on the sail can be described by the following expression:

$$f_{srp}=-A\gamma p\cos^2\beta\hat{n}$$

Where $\hat{n}$ is the sail's normal vector in the direction of the sun, cone angle $\beta$ is made between the sail normal vector $\hat{n}$ and the sun vector $\hat{s}$, $\gamma$ is the reflectance coefficient of the solar sail (for example $\gamma=0.8$ is reported for an aluminum coated plastic film), and p is the solar radiation pressure (for example $p=9.126\times10^{-6}$ N/m$^2$ at 1.0 AU). In case of perfect reflection, the thrust force is always along the sail normal vector $\hat{n}$ in the opposite direction. Supposing vector r connects the spacecraft's CoM 103 to the sail's OPC 204, the torque applied by the solar radiation pressure can be described by:

$$\begin{aligned}\tau_{srp} &= r\times f_{srp}\\ &= A\gamma p\cos^2\beta r\times\hat{n}\\ &= A\gamma p\left(\hat{n}^T\hat{s}\right)^2 r\times\hat{n}\\ &= A\gamma p\|r\|\hat{n}^T S\hat{n}(\hat{r}\times\hat{n})\end{aligned}$$

Where r is the unit vector $r/\|r\|$, and $S=\hat{s}\hat{s}^T$ is a projection matrix representing the sun direction.

In order to cancel angular momentum $h_g$ stored in the reaction wheels, the vector of torque generated by the solar radiation pressure should be aligned with the angular momentum vector in opposite direction. That is:

$$\tau_{srp}=\|\tau_{srp}\|\hat{h}_g$$

Where $\hat{h}_g$ is the unit vector $h_g/\|h_g\|$. The magnitude of the torque can be subsequently computed as:

$$\|\tau_{srp}\|^2=-A^2\gamma^2p^2\hat{n}^T[r\times]^2\hat{n}(\hat{s}^T\hat{n})^4$$

Where [□×] is the matrix from the cross-product. The square of the cross-product matrix satisfies the following identity:

$$[r\times]^2=-\|r\|^2(I-\hat{r}\hat{r}^T)$$

Where I is the identity matrix. Using the above, the solar radiation pressure torque magnitude can be expressed as follows:

$$\|\tau_{srp}\|=A\gamma p\|r\|\hat{n}^TS\hat{n}\sqrt{1-(\hat{r}^T\hat{n})^2}$$

This equation implies that the torque-per-unit area of the solar sail is:

$$\frac{\|\tau_{srp}\|}{A}=\gamma p\|r\|\eta$$

where $\eta:=\hat{n}^TS\hat{n}\sqrt{1-(\hat{r}^T\hat{n})^2}$ is regarded as the efficiency of the solar sail. The parameters $\gamma$, p and $\|r\|$ can be treated as constant design parameters. Accordingly, to optimize efficiency $\eta$, optimal unit vectors $\hat{r}$ (i.e. the position of the solar sail 201 or orientation of the OPC relative to the spacecraft CoM) and $\hat{n}$ (i.e. the orientation of the solar sail 201) can be determined to maximize kinematic advantage subject to one or more constraints.

Figure 6:
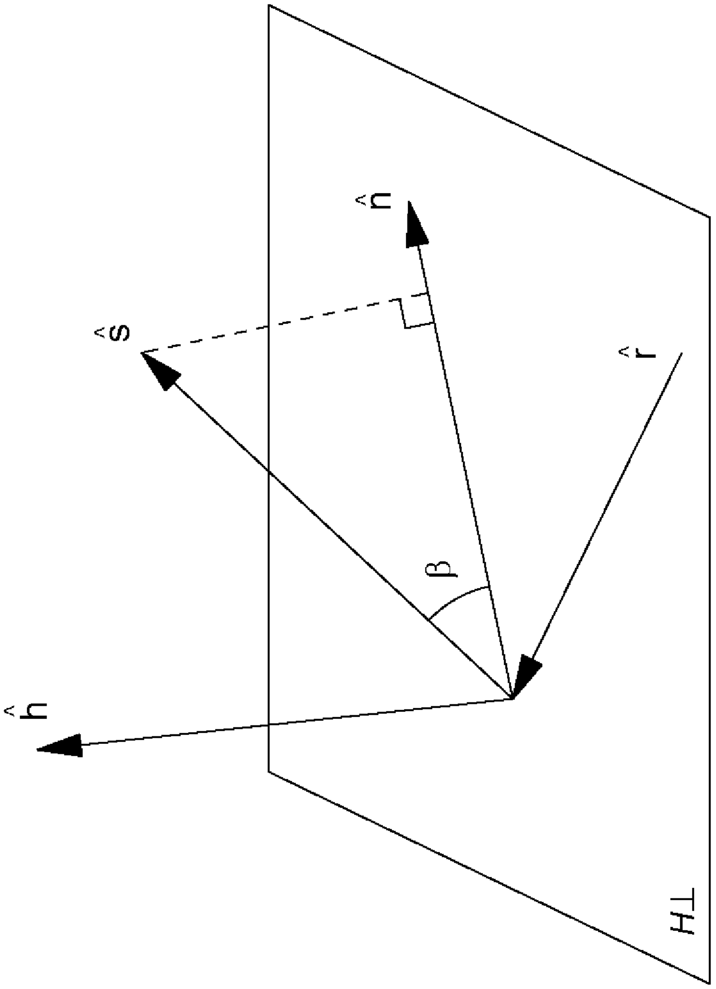
FIG. 6 is a schematic illustrating the sun vector and sail normal vector with respect to angular momentum vector.

At least one constraint can be imposed by the direction of the angular momentum (i.e. such that the solar radiation pressure torque can counteract angular momentum stored in the reaction wheels). As illustrated in FIG. 6, in order to align the solar radiation pressure torque vector with the angular momentum vector, both $\hat{r}$ and $\hat{n}$ must be orthogonal to the unit vector $\hat{h}$, creating the constraints:

$$\hat{h}^T\hat{r}=0 \text{ and } \hat{h}^T\hat{n}=0$$

As can be appreciated, additional constraints can be imposed when solving for an optimal solar sail position $\hat{r}$ and/or solar sail orientation $\hat{n}$. For example, environmental constraints can place limits on the possible position and orientation of solar sail 201. Such constraints can include positioning and orienting the solar sail 201 to produce a desaturation torque while not obstructing the solar array 117 and/or radio antennas 119. In some embodiments, additional kinematic constraints can apply, for example if the robotic arm 250 has few degrees of freedom and/or a limited range of motion. It is appreciated that other constraints can be considered as well. Such additional constraints can be represented by a set of inequalities:

$$\phi(\hat{r})\leq 0$$

For example, imposing the azimuth angles within $\alpha_{min}$ and $\alpha_{max}$ gives the following constraint function:

$$\phi(\hat{r}):=\begin{bmatrix}\operatorname{atan2}(\hat{r}_y,\hat{r}_x)-\alpha_{max}\\ -\operatorname{atan2}(\hat{r}_y,\hat{r}_x)+\alpha_{min}\end{bmatrix}$$

The problem of maximizing the efficiency of the solar sail can thus be formulated through the following nonlinear programming:

$$\max_{\hat{n},\hat{r}}\eta(\hat{n},\hat{r})$$

-continued $$\text{Subject to: } \hat{h}^T\hat{n}=0$$
$$\hat{h}^T\hat{r}=0$$
$$\phi(\hat{r})\leq 0$$

If the unit vector $\hat{r}$ can be freely selected, then it can be readily inferred that an optimal $\hat{r}$ must satisfy:

$$\hat{r}^T\hat{n}=0 \wedge \hat{r}^T\hat{h}=0 \Rightarrow \hat{r}\|\hat{n}\times\hat{h}$$

In this case, given that unit vectors $\hat{n}$, $\hat{r}$ and $\hat{h}$ are mutually orthogonal, optimal $\hat{r}$ can be automatically obtained once optimal $\hat{n}$ is determined. By virtue of the above, the expression of torque magnitude can be simplified to:

$$\|\tau_{srp}\|=-A\gamma p\|(\hat{s}^T\hat{n})^2$$

Which is independent of $\hat{r}$. Given that $\hat{n}^Y\hat{n}=1$, the problem of finding the optimal sail orientation maximizing solar radiation torque can be transcribed into the following constrained quadratic programming:

$$\min_{\hat{n}}\hat{n}^T(I-S)\hat{n}$$
$$\text{Subject to: } \hat{h}^T\hat{n}=0$$

Using the Lagrangian formulation, the above quadratic programming can be readily resolved:

$$\hat{n}^{on}=\frac{(I-\hat{h}\hat{h}^T)\hat{s}}{\|(I-\hat{h}\hat{h}^T)\hat{s}\|}$$

$$\hat{r}=\frac{\hat{h}\times\hat{s}}{\|\hat{h}\times\hat{s}\|}$$

Where $\hat{n}^{on}$ denotes the orientation of the sail 201 while in the active mode. The optimal solar sail azimuth and elevation angles corresponding to the unit vector $\hat{n}^{on}$ can be obtained from:

$$\alpha_n=\operatorname{atan2}(\hat{n}_y,\hat{n}_x)$$
$$\delta_n=\operatorname{atan2}(\hat{n}_z\cos(\alpha_n),\hat{n}_x)$$

Substituting the optimal sun vector into the expression of the solar radiation pressure torque yields an estimation of maximum solar radiation pressure torque along unit vector $\hat{h}_g$:

$$\|\tau_{srp}\|=A\gamma p\|(1-\hat{h}^TS\hat{h})$$

Thus, an "on" time (i.e. the time during which the solar sail is in the active mode) of an on/off duty-cycle required to unload angular momentum can be computed from:

$$t_{dump}=\frac{\|h_g\|}{\|\tau_{srp}\|}$$

The robotic arm 250 can also operate solar sail 201 in a passive mode in which the sail 201 is positioned and oriented to avoid generating torque. For example, after excess momentum stored in reaction wheels 115 has been unloaded using torque generated by the solar sail 201, the solar sail's torque generation can be ceased to avoid reverse actuation saturation. This can be accomplished by sheltering the solar sail 201 from torque-generating solar radiation, for example by positioning and/or orienting the solar sail 201 with its normal plane vector $\hat{n}$ orthogonal to the sun pointing vector $\hat{s}$, such that the solar sail 201 is on edge with respect to the solar radiation 300. In other words, the solar radiation pressure torque becomes zero if the solar sail 201 is oriented such that its unit vector while in the passive mode, denoted $\hat{n}^{off}$, is perpendicular to the sun-line, i.e. $\hat{s}^T\hat{n}^{off}=0$. There are infinitely many solutions to this equation. Accordingly, in some embodiments, a passive position and/or orientation that is closest to the active position and/or orientation can be identified, such that the solar sail 201 can be operated between the active and passive modes with minimal movement of the robotic arm 250. This can be formulated as:

$$\min_{\hat{n}^{off}} 1-\left(\hat{n}^T\hat{n}^{off}\right)^2$$

$$\text{Subject to: } \hat{s}^T\hat{n}^{off}=0$$

The optimal solution for optimal passive orientation is found to be:

$$\hat{n}^{off}=\frac{(S-I)\hat{h}\hat{h}^T\hat{s}}{\left\|(S-I)\hat{h}\hat{h}^T\hat{s}\right\|}$$

In some embodiments, the solar sail 201 can be stowed or parked at a designated position on the spacecraft body 101, such as at stowage interface 123. As can be appreciated, the solar sail 201 should not generate a torque while in this position. To accomplish this, the solar sail 201 can be oriented by robotic arm 250 such that while the solar sail is parked in stowage interface 123, the normal plane vector of sail $\hat{n}$ is orthogonal to both the sun vector $\hat{s}$ and a vector aligned with an axis of the stowage interface 123. In some embodiments, sheltering the solar sail 201 from torque-generating solar radiation can additionally or alternatively comprise retracting and/or covering the reflective surface 207.

In the above-described example, a single planar sail and a robotic arm with seven degrees of freedom were described for generating torques to provide attitude control and/or momentum desaturation. It is appreciated, however, that other configurations are possible. For example, the robotic arm 250 can be provided with four or more degrees of freedom to allow for optimal positioning and orienting of the solar sail plane for maximum effect on the spacecraft body 101. While four degrees of freedom can allow for optimal positioning, it is appreciated that additional degrees of freedom can be used to overcome constraints such as reaching around the spacecraft body 101 and/or avoiding obstacles, such as avoiding obstruction of solar array 117 and/or antennas 119. When configuring the mobility of robotic arm 250, it can be appreciated that solar sail 201 roll orientation about the sun vector and fore-aft position of the solar sail 201 along the sun vector can be considered unimportant.

It should be appreciated that further configurations of the solar sail and/or robotic arm are possible, provided that the robotic arm and/or solar sail are configured to generate control torques about any axis perpendicular to the sun vector. For example, in some embodiments, a robotically tilted solar sail can be provided which can impart a pitch-yaw attitude control torque with a roll component. In some embodiments, two or more robotic arms can be provided with two or more corresponding sails, for redundancy, greater effect, or to allow a balanced configuration and achieve roll attitude and momentum control about the sun pointing vector without affecting pitch or yaw (i.e. enabling pitch-yaw balanced forces and pure roll torque capability). For example, if a roll torque component is desired, then the solar sail can be configured with an orientation such that it is tilted about the axis normal to the roll vector, e.g. like the blade of a windmill. It can be appreciated that with a single solar sail 201 there will always be a coupling between the roll axis and the pitch-yaw axis. Accordingly, to deliver a pure roll torque about the sun pointing vector, two or more solar sails 210 acting in a balanced fashion can be provided. Of course, many other configurations are also possible.

Figure 7:
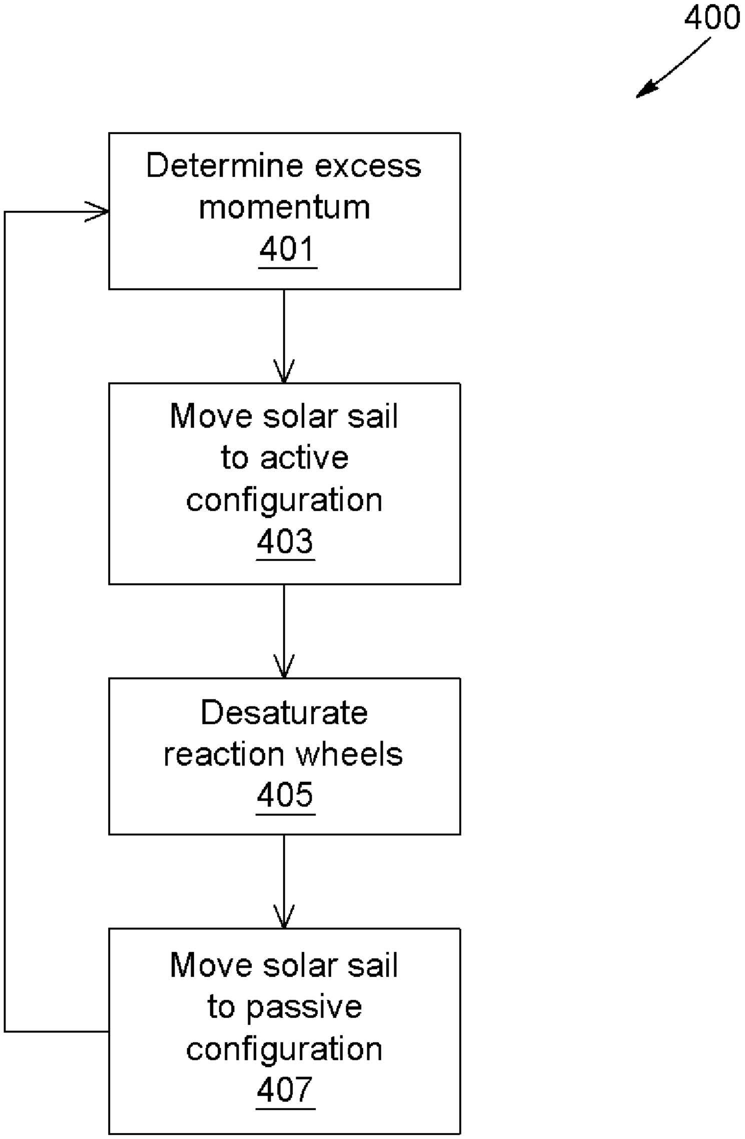
FIG. 7 is a flowchart illustrating a method for desaturating reaction wheels of a spacecraft using a solar sail attitude control module, according to an embodiment.

With reference now to FIG. 7, an exemplary method 400 of using attitude control module 200 to unload excess momentum from the spacecraft 100 of FIG. 1 is shown. As can be appreciated, in some embodiments, the steps of method 400 can be carried out by the onboard computer 121, i.e. one or more processors or other programmable logic devices onboard spacecraft 100 which can control and/or interact with the spacecraft's various subsystems. In some embodiments, at least some of the steps can be commanded by control signals received via communications subsystem, such as from a ground control station. In some embodiments, the steps of method 400 can be substantially automated.

A first step 401 of method 400 can include determining excess momentum to be unloaded from spacecraft 401. As an example, this can comprise measuring a speed of the reaction wheels 115 and/or utilizing attitude sensors 113 to calculate a vector of excess momentum to be unloaded. In some embodiments, determining the excess momentum can comprise estimating excess momentum that is likely to be imparted on the spacecraft 100 (for example due to gravity gradients) using a model of the spacecraft's flight path.

A second step 403 can comprise moving the solar sail 201 into an active mode such that it can generate torque using solar radiation pressure. In some embodiments, the solar sail 201 can be stowed at a defined location on spacecraft body 101. Accordingly step 403 can comprise operating the robotic arm 250 to couple with the solar sail 201 and remove it from the stowed location. In some embodiments, the solar sail 201 can be retracted. Accordingly, step 403 can comprise operating the solar sail's deployment mechanism to extend and tension the sail film 203 and expose reflective surface 207. As can be further appreciated, in order to unload excess momentum, the solar sail 201 must generate torque which opposes the excess momentum. Accordingly, step 403 can comprise operating the robotic arm 250 to position and orient the solar sail 201 relative to the spacecraft body 101 such that the vector of torque generated by the solar sail 201 opposes the vector of the excess momentum. Preferably, the robotic arm 250 operates the solar sail 201 in a suitable position and orientation without changing a position or pointing direction of spacecraft body 101. It is appreciated, however, that in some embodiments, positioning and orienting solar sail 201 can comprise adjusting a pointing direction of spacecraft body 101. Moreover, the robotic arm 250 can position the solar sail 201, such that there is no interference with solar array 117, RF antennas 119, or other equipment, while the solar sail 201 is generating torque.

Once the solar sail 201 is deployed and properly oriented, a third step 405 can comprise using the torque generated by the solar sail 201 to desaturate the reaction wheels 115. In particular, momentum can be unloaded from the reaction wheels 115 by reducing a rotation speed of one or more wheels and utilizing the torque from solar sail 201 to maintain the pointing direction of the spacecraft 100. As can be appreciated, step 405 can be carried out over an extended period until a desired amount of momentum has been unloaded from the reaction wheels 115. In some embodiments, the robotic arm 250 can be operated to continuously adjust solar sail 201 position and/or orientation during desaturation to maintain a maximum desaturating torque, for example if the spacecraft 100 position and/or orientation changes during desaturation.

After a desired amount of momentum has been unloaded, a subsequent step 407 can comprise moving the solar sail 201 to a passive mode such that it no longer produces torque from solar radiation pressure. In some embodiments, this can comprise retracting the solar sail 201 to shelter the reflective surface 207 from solar radiation. In some embodiments, the solar sail 201 can be oriented such that its normal vector is substantially orthogonal to the sun vector, so that the solar sail does not reflect solar photons. In further embodiments, the solar sail 201 can be parked at a designated location on spacecraft body 101, thus freeing up the robotic arm 250 to perform other tasks. In some embodiments, the solar sail 201 can be positioned and oriented while in the passive mode such that it does not interfere with solar array 117, RF antennas 119, or other equipment.

As can be appreciated, the solar sail 201 can remain in the passive mode for an extended period when it is not needed. Once the reaction wheels 115 need to be desaturated again, for example due to disturbance torques causing spacecraft momentum to increase over time, the process can return to step 401.

In some embodiments, the spacecraft 100 can be operated in a plurality of operational modes. Accordingly, the method 400 can be carried out while the spacecraft 100 is in a desaturation mode. Once the spacecraft 100 is desaturated, it can return to other operational modes while the solar sail 201 is maintained in the passive mode. Alternatively, the solar sail 201 can be positioned while in the active mode such that it does not interfere with other spacecraft tools and/or instruments. In such configurations, method 400 can be carried out while spacecraft 100 is performing other operations.

As can be appreciated, at least some of the above-described steps can be implemented as part of an attitude control system. The attitude control system can, for example, continuously calculate the optimal position and orientation of the solar sail 201, and generate the required control signals to operate the solar sail 201 into the active and/or passive modes when needed to unload excess momentum while avoiding reverse actuation saturation.

Figure 8:
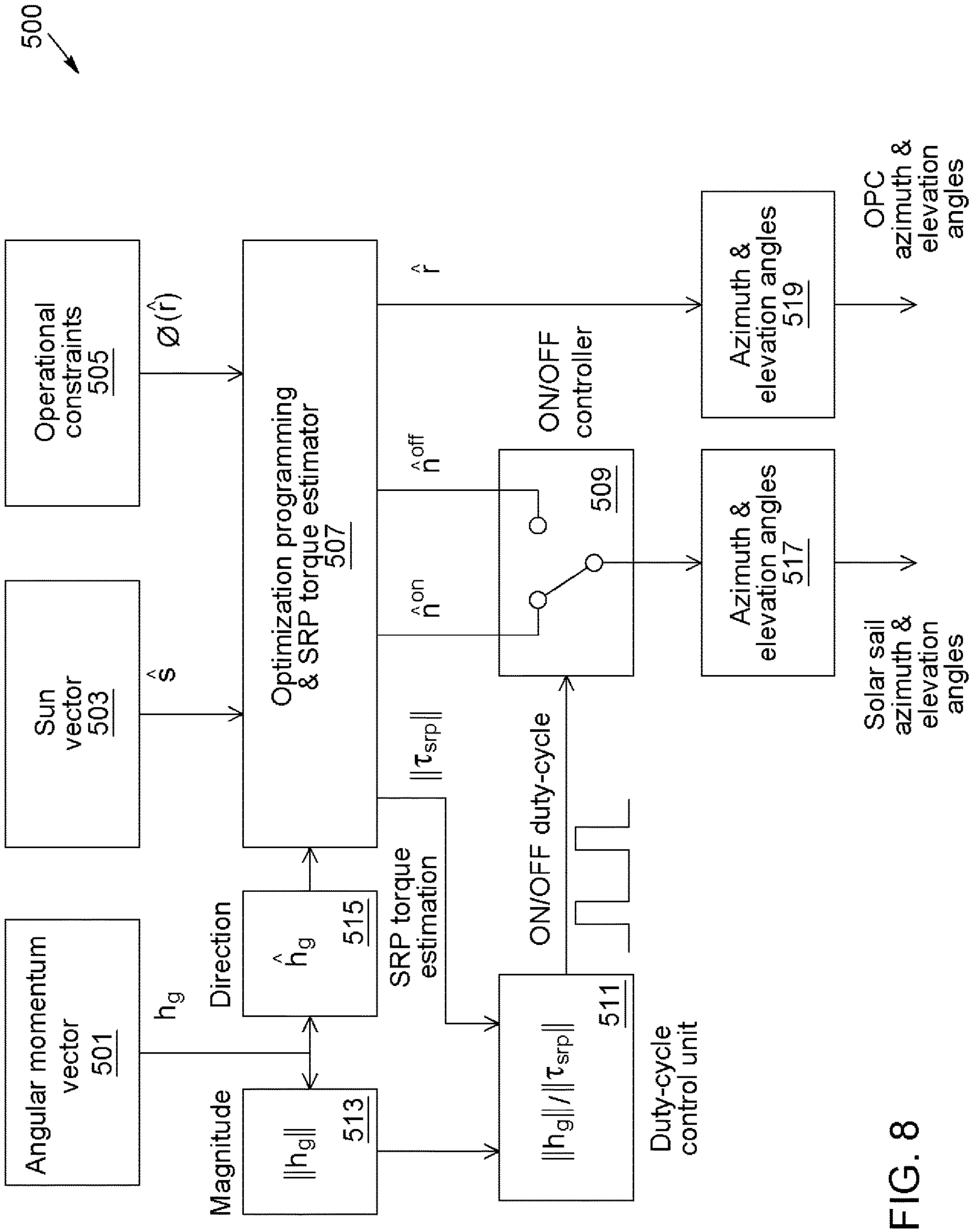
FIG. 8 is a block diagram illustrating an architecture of an attitude and momentum control system which uses solar sail, according to an embodiment.

With additional reference to FIG. 8, an exemplary attitude control system 500 is shown according to an embodiment. In the illustrated embodiment, input modules 501, 503 and 505 respectively provide excess angular momentum vector $h_g$ (for example corresponding to excess momentum over one orbital period), sun vector $\hat{s}$, as well as defined operational or environmental constraints $\phi(\hat{r})$ as inputs. As can be appreciated, input modules 501 and 503 can obtain $h_g$ and $\hat{s}$ by measurement, by estimation from an orbital mechanics model, or a combination of both. Module 505 can provide environmental constraints $\phi(\hat{r})$ based on user-defined parameters, for example based on mechanical or environmental limitations on solar sail positioning, based on rules on when the solar sail should or should not be operated, etc.

The direction of the angular momentum $\hat{h}_g$ (for example computed via module 515) along with the sun vector $\hat{s}$ can be provided to an optimization and solar radiation pressure torque estimator module 507. This module 507 can subsequently compute optimal values of solar sail orientation in the active $\hat{n}^{on}$ and passive $\hat{n}^{off}$ modes, optimal solar sail position $\hat{r}$ (i.e. orientation of the OPC relative to spacecraft CoM), and estimated magnitude of the solar radiation pressure torque $\|\tau_{srp}\|$. Such values can be computed, for example, using the equations presented and discussed above. As can be appreciated, in the active mode, the solar sail is preferably positioned and oriented to dampen all three components of the angular momentum (ex: pitch, yaw and roll) vector simultaneously and/or as quickly as possible.

The magnitude of the angular momentum $\|h_g\|$ (for example computed via module 513) along with the magnitude of the solar radiation pressure torque $\|\tau_{srp}\|$ can be provided to a duty-cycle control unit 511 for computing duty-cycles and generating a corresponding control signal. This on/off duty cycle signal can be used by an ON/OFF controller 509 to switch back and forth between the active and passive modes of the solar sail to allow unloading the excess momentum without reversing momentum accumulation. Finally, the direction cosines $\hat{n}$ received from ON/OFF controller 509 and $\hat{r}$ received from module 507 can be converted by modules 517 and 519 to corresponding azimuth and elevation angles that can constitute control commands for the robotic arm or other manipulator holding the solar sail. Although a particular control system architecture has been described, other configurations are also possible depending on the control requirements. It is further appreciated that the attitude control system 500 can be implemented by one or more controllers/processors. A non-transitory computer-readable medium can be provided with instructions stored thereon which, when executed, cause a processor to carry out the steps described above.

It should be appreciated that the above-described systems and methods can provide attitude control and momentum desaturation to various types of spacecraft with different flight characteristics. In some embodiments, the time available to conduct desaturation operations can be limited. Accordingly, the attitude control module 200 should be configured to allow sufficient desaturation within the limited timeframe. As an example, if spacecraft 100 is in orbit around a celestial body, such as the moon, torque disturbances are imparted to spacecraft throughout each orbital period due to gravity gradient and solar radiation pressure on the entire spacecraft. In order to maintain attitude control, the module 200 should be able to unload the momentum caused by these torque disturbances within a single orbital period. This can be accomplished by calculating and/or simulating the expected momentum absorbed by the spacecraft 100 throughout one orbital period (for example using appropriate modelling techniques), and configuring the solar sail 201 with a sufficient area and/or the robotic arm 250 with a sufficient length to allow producing sufficient torque to unload the expected momentum in less than one orbital period. Exemplary calculations and simulations were carried out in connection with the Lunar Gateway in a near-rectilinear halo orbit in Aghili, F. & Rey, D., 19-22 Aug. 2019, 'A Steerable Robotic Solar-Sail for Angular Momentum Dumping in the Lunar Gateway', AIAA Propulsion and Energy Forum, and in Aghili F. & Rey D. July 2020, 'Dumping momentum on the lunar Gateway using a robotically steerable solar sail', AIAA Journal of Guidance, Control, and Dynamics, the entirety of which are incorporated herein by reference. In these examples, it was determined that a solar surface area of 30 $m^2$ would be sufficient to unload gravity gradient induced angular momentum accumulated over one orbital period within 1.8 days. Since the orbital period is approximately 6.5, desaturation could be carried out during unused operational time. Of course, different sail configurations can be provided depending on the needs of a particular spacecraft.

As can be appreciated, the above-described systems and methods allow providing propellant-free attitude control and momentum desaturation using a steerable robotic solar sail to generate torques using solar radiation pressure. Since propellant is not required, it can provide a cost-effective solution if the collective mass of the solar sail and its supporting structure and accessories are sufficiently small. More particularly, the usage of such a system can be economically justified if the mass of the solar-sail package is significantly less than the overall propellant mass which would otherwise be required to perform the same tasks.

While the above description provides examples of embodiments, it will be appreciated that some features and/or functions of the described embodiments are susceptible to modification without departing from the spirit and principles of operation of the invention. Accordingly, what has been described above has been intended to be illustrative and non-limiting and it will be understood by persons skilled in the art that other variants and modifications may be made without departing from the scope of the invention as defined in the claims appended hereto. Moreover, although some aspects and advantages have been explicitly described, other aspects and advantages may become apparent to persons skilled in the art upon reading the present disclosure.

The invention claimed is:

1. An attitude control module for providing propellant-free attitude control and momentum desaturation to a spacecraft, the attitude control module comprising:
- at least one solar sail comprising a reflective surface for reflecting solar photons; and
- at least one robotic arm coupled to the at least one solar sail, said at least one robotic arm comprising at least 4 degrees of freedom for positioning and orienting the at least one solar sail relative to the spacecraft.

2. The attitude control module according to claim 1, wherein the at least one robotic arm is configured with at least 2 degrees of freedom to control an azimuth and elevation of the solar sail reflective surface, and at least 2 degrees of freedom to control a position of the solar sail relative to a center of mass of the spacecraft.

3. The attitude control module according to claim 2, wherein the position of the solar sail is defined by a position vector connecting an optical pressure center of the solar sail with the center of mass of the spacecraft, further wherein the robotic arm is configured to control the position of the solar sail along the at least 2 degrees of freedom by controlling an azimuth and elevation of the position vector.

4. The attitude control module according to claim 1, wherein the spacecraft orbits about a celestial body, further wherein the at least one solar sail is sized and positioned to generate sufficient torque such that angular momentum induced by disturbance torques over the course of one orbital period can be unloaded over less than one orbital period.

5. The attitude control module according to claim 1, wherein the robotic arm is configured to move the at least one solar sail between an active mode and a passive mode, further wherein:
- in the active mode, the at least one solar sail is exposed to solar radiation and generates a torque opposing angular momentum stored in the spacecraft; and
- in the passive mode, the at least one solar sail is sheltered from solar radiation.

6. The attitude control module according to claim 5, wherein in the passive mode, the at least one solar sail is oriented such that a normal vector of the solar sail is substantially orthogonal to a sun vector.

7. The attitude control module according to claim 5, wherein in the passive mode, the reflective surface of the at least one solar sail is retracted or covered.

8. The attitude control module according to claim 1, wherein the robotic arm is configured to orient the at least one solar sail to generate a control torque about any axis perpendicular to the sun vector.

9. The attitude control module according to claim 1, wherein the at least one solar sail is configured to generate a torque from solar radiation pressure which includes at least a roll component in addition to a pitch and a yaw component.

10. The attitude control module according to claim 1, wherein the at least one solar sail comprises two solar sails, further wherein the two solar sails are used in a balanced configuration to generate a roll torque about a sun pointing vector.

11. A method for desaturating reaction wheels of a spacecraft, comprising:
- determining a momentum vector corresponding to excess momentum stored in the reaction wheels;
- operating at least one robotic arm along at least 4 degrees of freedom to position and orient at least one solar sail coupled to the at least one robotic arm into an active mode in which the at least one solar sail is exposed to solar radiation and generates a torque opposing the momentum vector; and
- desaturating the reaction wheels using the torque generated by the at least one solar sail.

12. The method according to claim 11, further comprising computing an optimal position and orientation of the solar sail to generate a maximum torque subject to one or more constraints, and providing a control signal to the robotic arm to move the solar sail to the computed position and orientation.

13. The method according to claim 12, where the control signal comprises an orientation of the solar sail reflective surface along two degrees of freedom, and a position of an optical pressure center (OPC) of the solar sail relative to a center of mass (CoM) of the spacecraft along two degrees of freedom.

14. The method according to claim 13, wherein the two degrees of freedom of the solar sail reflective surface orientation comprises an azimuth angle and an elevation angle, further wherein the position of the OPC is defined by a position vector connecting the OPC with the CoM, further wherein the two degrees of freedom of the OPC position comprises an azimuth angle and an elevation angle of the position vector.

15. The method according to claim 12, wherein the one or more constraints comprises positioning the solar sail such that it does not interfere with spacecraft solar arrays or RF communication antennae.

16. The method according to claim 11, wherein the robotic arm is operated to offset an OPC of the solar sail from a CoM of the spacecraft.

17. The method according to claim 11, further comprising operating the solar sail into a passive mode in which the solar sail is sheltered from solar radiation.

18. The method according to claim 17, further comprising generating an on/off duty cycle control signal and alternating the solar sail between the active mode and the passive mode based on the duty cycle control signal.

19. The method according to claim 18, comprising calculating an estimated maximum solar radiation pressure torque, further wherein the on/off duty cycle control signal is generated based on the estimated maximum solar radiation pressure torque and a magnitude of excess momentum to be unloaded.

20. The method according to claim 17, wherein operating the solar sail into the passive mode comprises operating the robotic arm to orient a normal vector of the solar sail substantially orthogonal to a sun vector, further wherein the orientation of the solar sail in the passive mode is selected to minimize orientation-changing maneuvers when moving between the active mode and the passive mode.

21. The method according to claim 11, wherein excess momentum is imparted on the spacecraft due to disturbance torques throughout an orbital period about a celestial body, further wherein the solar sail is positioned to unload the excess momentum imparted in less than one orbital period.

22. The method according to claim 11, comprising operating a pair of robotic arms to position a pair of corresponding solar sails in a balanced configuration to generate a roll torque about a sun pointing vector; and desaturating the reaction wheels using the roll torque.

23. An attitude control module for providing propellant-free attitude control and momentum desaturation to a spacecraft having reaction wheels, the attitude control module comprising:

at least one solar sail comprising a reflective surface for reflecting solar photons;

at least one robotic arm coupled to the at least one solar sail, said at least one robotic arm comprising at least 4 degrees of freedom for positioning and orienting the at least one solar sail relative to the spacecraft; and a controller operable to:

determine a momentum vector corresponding to excess momentum stored in the reaction wheels;

compute an optimal position and orientation of the at least one solar sail to generate a maximum torque subject to one or more constraints; and providing a control signal to the robotic arm to move the solar sail to the computed position and orientation;

provide a control signal to the at least one robotic arm to position and orient the at least one solar sail into the computed position and orientation to generate a torque opposing the momentum vector; and desaturate the reaction wheels using the torque generated by the at least one solar sail.

* * * * *